(12) United States Patent
Lauro

(10) Patent No.: US 7,279,189 B2
(45) Date of Patent: Oct. 9, 2007

(54) STABILIZED NATURAL BLUE AND GREEN COLORANTS

(75) Inventor: Gabriel J. Lauro, Orange, CA (US)

(73) Assignee: Colormaker, Inc., Anaheim, CA (US)

( * ) Notice: Subject to any disclaimer, the term of this patent is extended or adjusted under 35 U.S.C. 154(b) by 252 days.

(21) Appl. No.: 10/884,072

(22) Filed: Jul. 2, 2004

(65) Prior Publication Data

US 2006/0003060 A1 Jan. 5, 2006

(51) Int. Cl.
*A23L 1/27* (2006.01)
(52) U.S. Cl. ............... 426/250; 426/540; 426/262; 8/646
(58) Field of Classification Search ........... 426/250, 426/72, 540, 262; 8/646
See application file for complete search history.

(56) References Cited

U.S. PATENT DOCUMENTS

| | | | |
|---|---|---|---|
| 4,208,434 A | 6/1980 | Iacobucci et al. | |
| 4,481,226 A | 11/1984 | Crosby et al. | |
| 5,908,650 A | 6/1999 | Lenoble et al. | |
| 6,171,602 B1 * | 1/2001 | Roman | 424/401 |
| 6,391,372 B1 | 5/2002 | Nair et al. | |
| 6,444,249 B1 | 9/2002 | Nair et al. | |
| 6,881,430 B2 * | 4/2005 | Kohler et al. | 426/250 |
| 2003/0082281 A1 | 5/2003 | Kohler et al. | |
| 2004/0121050 A1 * | 6/2004 | Thurman et al. | 426/120 |
| 2005/0090414 A1 * | 4/2005 | Rich | 510/136 |

FOREIGN PATENT DOCUMENTS

WO WO 9507623 A1 * 3/1995

* cited by examiner

*Primary Examiner*—C. Sayala
(74) *Attorney, Agent, or Firm*—Orrick, Herrington & Sutcliffe LLP

(57) ABSTRACT

A natural blue colorant solution comprising red cabbage liquid, aluminum sulfate and sodium bicarbonate is disclosed. The pH of the colorant solution is in the range of 3.8 to 4.2 and can be used to provide a blue hue when incorporated into products having a pH greater than 5.5. A highly stable blue colorant solution is created when the weight ratio of the aluminum sulfate and sodium bicarbonate is approximately 2:1. The blue colorant solution can be modified to create a natural green colorant solution by the addition of a natural yellow colorant and additional sodium bicarbonate.

24 Claims, No Drawings

STABILIZED NATURAL BLUE AND GREEN COLORANTS

FIELD OF THE INVENTION

The invention relates generally to natural colorants and methods for making such colorants. More specifically, the invention relates to stable blue and green colorants with shelf lives sufficient for use in food, beverage, drug, and cosmetic applications and methods of making such colorants.

BACKGROUND OF THE INVENTION

Artificial colors are also known as certifiable colors because they are required to undergo certification by the Federal Drug Administration (FDA) prior to usage in food or drugs. Artificial colors such as FD&C Yellow No. 6, FD&C Blue No. 1, and FD&C Red No. 40 provide a wide spectrum of colors for use in foods, beverages, drugs, and cosmetics. However, both consumers and manufacturers have created a demand for natural colorant alternatives. Natural colors are exempt from the certification process, but still undergo safety reviews by the FDA. The FDA has created a list of natural colorants that have been approved for use in foods. This list includes red cabbage, beet juice or powder, carmine, grape skin extract, and color extractives from grapes.

Many of the sources of natural food colorants contain a chemical called anthocyanins which belong to a larger class of compounds called flavonoids. Anthocyanins are composed of aglycone (anthocyanidin), sugar and may also include organic acids. Anthocyanins are water soluble pigments that occur naturally in a variety of plants, vegetables, flowers, and grains. Anthocyanins can be found in high levels in plant or plant products such as grape juice, grape skin extract, elderberry, purple carrot, red radish, and red cabbage.

As a group, anthocyanins exhibit diverse color qualities at different pH levels. For example, at a pH of about 3, anthocyanins will exhibit a red color. However, when placed in a more basic environment, at a pH of 8 for example, the anthocyanin may be green or blue. The color intensity of anthocyanins also varies with pH, with the highest color intensity exhibited at pH values less than 4. However, anthocyanin extracts are typically unstable at a pH higher than 6. It is an object of the present invention to provide stabilized blue and green colorants which retain their hue when used as a colorant in slightly acidic, neutral, and/or basic conditions.

Although generally more expensive than other sources of anthocyanins, red cabbage extracts are often used in natural colorants. Red cabbage comprises fifteen anthocyanins. These fifteen anthocyanins all have cyanidin as the aglycone and glucose as the sugar. Red cabbage anthocyanins comprise the organic acids ferulic and coumaric to produce acylated anthocyanins. As compared to most other anthocyanin extracts, the red cabbage extract shows improved stability when exposed to heat or light. This improved stability is due to the presence of acylated anthocyanins. Red cabbage extract also exhibits a high tinctorial strength compared to other anthocyanin-based colors.

U.S. Patent Application Publication No. 2003/0082281 by Kohler et al describes a blue colorant that is formed by the combination of an anthocyanin, such as red cabbage, and an aluminum compound. Kohler et al discloses an aluminum lake or a blue lake in which a base is added to raise the pH to the range of 5 to 9 to form a precipitate. However, no reference is made to the formation of blue dye colorant that is water soluble and is created without forming a precipitate or raising the pH of the colorant above 4.5.

While many colors are available in a natural colorant, the colors blue and green are noticeably absent in this group. Accordingly, a natural blue colorant that can be used in a wide variety of food, drug and cosmetic applications would be considered useful.

SUMMARY OF THE INVENTION

The present invention is directed to stabilized blue and green colorant solutions which provide a natural colorant alternative to the use of artificial colors to generate blue and green colors in products. The present invention is also directed at methods of preparing such colorant solutions. Typically, natural food colorants can only produce two of the three primary colors: red and yellow. A stabilized form of a natural blue colorant has not been achieved which can be used in a variety of food, beverage, drug and cosmetic applications.

In one aspect of the present invention, a blue colorant solution is disclosed which comprises three main ingredients: red cabbage liquid, aluminum sulfate, and sodium bicarbonate. Combination of these three ingredients and other additives as necessary to a particular application creates a natural blue colorant solution with a pH in the range of 3.8 to 4.2 which maintains a blue hue when incorporated into products having a pH above 5.5.

In a preferred embodiment, the ratio of aluminum sulfate to sodium bicarbonate is approximately 2:1. At or near this ratio, the stability and shelf life of the blue colorant solution is maximized. In other embodiments, the ratio of aluminum sulfate to sodium bicarbonate may be in the range of 1:1 to 2:1. As the ratio approaches 1:1, the stability and shelf life of the blue colorant solution generally decreases.

In another aspect of the present invention, a stabilized green colorant solution may be produced by the addition of a natural yellow colorant and additional sodium bicarbonate such that the ratio of aluminum sulfate to sodium bicarbonate is in the range of 1:2 to 1:3.

DETAILED DESCRIPTION OF THE PREFERRED EMBODIMENTS

All references to percentages in both the specification and the claims are to percentages by weight unless otherwise indicated.

The stabilized blue colorant is formed by the combination of three main ingredients: red cabbage liquid, sodium bicarbonate ($NaHCO_3$) and aluminum sulfate ($Al_2(SO_4)_3$). As discussed further below, additional ingredients and compounds are added to the colorant solution depending on the application.

Red cabbage extracts are water soluble and are available in either a liquid form or a sprayed-dried form. In a preferred embodiment, red cabbage liquid is used. Red cabbage liquid is available from a number of sources such as Colarome, Inc. Red cabbage liquid is prepared from the harvested leaves of the plant. The leaves are typically blanched and then placed in a high pressure press. The exudate is collected and vacuum concentrated to the desired concentration. The concentrated liquid can then be frozen or stored at a low temperature. Red cabbage liquid generally exhibits a wide range of hues depending on the pH, and even slight changes in the pH can drastically change the color of the liquid. Red cabbage liquid is most stable at a low pH of about 3 or 4, and the hue at this range is generally red. The percentage of red cabbage liquid in the overall colorant solution may be between 10% and 67%. More preferably, the red cabbage liquid comprises between 12% and 35% of the overall solution.

The aluminum sulfate and sodium bicarbonate used can be any food grade aluminum sulfate and sodium bicarbonate which are known in the art of color preparation. Aluminum sulfate and sodium bicarbonate acceptable for this invention can be purchased from any chemical supplier. Preferably, both the aluminum sulfate and sodium bicarbonate are added as solids. The percentage of aluminum sulfate in the overall solution generally is in the range of 0.10% to 5%. In a preferred embodiment, aluminum sulfate comprises approximately 0.5% to 4.25% of the solution. As discussed further below, sodium bicarbonate percentages typically vary according to the levels of aluminum sulfate. In general, the level of sodium bicarbonate may vary from approximately 0.05% to about 5% and more preferably is in the range of 0.5% to 4%.

In a most preferred embodiment, the ratio between aluminum sulfate and sodium bicarbonate is approximately 2:1. At this preferred ratio, the blue colorant exhibits the highest degree of stability when exposed to various factors such as product processing, heat, and light, and the shelf life of the colorant is maximized at or near the two to one ratio. In other embodiments, the ratio between aluminum sulfate and sodium bicarbonate may be in the range of about 1:1 to 2:1. As the ratio approaches 1:1, the colorant becomes less stable. A colorant with nearly equal percentages of aluminum sulfate and sodium bicarbonate may still exhibit the blue hue, but the shelf life of the colorant is reduced as compared to a blue colorant using the preferred 2:1 ratio of aluminum sulfate and sodium bicarbonate.

The percentages of aluminum sulfate and sodium bicarbonate are generally directly related to the percentage of red cabbage liquid in the overall colorant solution such that an increased percentage of red cabbage liquid typically requires an increased percentage of both aluminum sulfate and sodium bicarbonate to achieve a blue hue. The ratio of the red cabbage liquid to the aluminum sulfate is typically in the range of 7:1 to 12:1. For example, in a solution comprising 15% red cabbage liquid, the percentages of aluminum sulfate and sodium bicarbonate may be approximately 2% and 1% respectively. If the percentage of red cabbage liquid is increased to 24%, the percentages of aluminum sulfate and sodium bicarbonate may increase to about 3.2% and 1.6% respectively.

Depending on the application and the exact hue desired, additives can be included in the dye formation. Additives may be used to achieve specific functionality in the intended product system. For example, the additive may make the color strength or concentration more user friendly in a particular production situation. Additives may also be used to enhance and maintain a particular hue that the user has determined to be optimal. Furthermore, additives can be used to make colorant preparation and standardization easier.

A wide variety of additives may be used and the invention is not limited to the following examples. Instead, the examples should be treated as representative of the types of additives that may be used in conjunction with the present invention. Diluents or solvents such as water, glycerine, propylene glycol, alcohol, sorbates, vegetable oil and corn syrup solids may be used. Emulsifiers such as polysorbates, mono-diglycerides, and lecithin may be used as additives in particular formulations. Antioxidants and sequestrates such as rosemary herb extract may be used. Depending on the application, dry carriers may be used such as maltodextrin, dextrose, vegetable fibers, silicon dioxide, dairy based powders, soy isolate powders, starches, gums, polysaccharides, carboxymethylcellulose, and tri-calcium phosphate.

The hue of the solution may be modified by adding any other compatible natural colorant extracts, titanium dioxide, calcium carbonate, talc, and/or pH adjusting salts. For example, the blue colorant may be made into shades of purple with the addition of carmine solution. The blue colorant solution may be modified to create a natural green colorant solution by the addition of a natural yellow colorant such as saffron, tumeric, or beta-carotene. Preferably, the preparation of a green colorant also includes increasing the percentage of sodium bicarbonate such that the ratio of aluminum sulfate and sodium bicarbonate is in the range of about 1:2 to 1:3.

The blue colorant is prepared by placing the red cabbage liquid in a container. Typically, the red cabbage liquid has a pH in the range of 3.0 to 3.5. The aluminum sulfate is then added and vigorously mixed with the red cabbage liquid in order to dissolve the aluminum sulfate in the red cabbage liquid. At this point, the pH of the solution is approximately 1.8 to 2.5. The sodium bicarbonate is then added. Addition of the sodium bicarbonate creates a large amount of foam due to the escaping carbon dioxide gas, and, therefore, the sodium bicarbonate should be added slowly to allow the foam to settle. Additives such as glycerine may also be included during the mixing of the sodium bicarbonate to reduce the amount of foam created and to increase the microbial stability of the colorant. Combination of these ingredients yields a free flowing and easily pourable liquid colorant solution that can be used by a manufacturer of food, beverages, drugs, or cosmetics. Other additives may be included during the formation of the solution. The final colorant solution exhibits a blue hue and has a pH in the range of 3.7 to 4.2. The pH of the final solution may vary depending on the additives which have been included in the solution and from natural variation of the red cabbage liquid itself.

In one particular exemplary embodiment, a blue colorant solution was formed which comprised 30% red cabbage liquid, 4% aluminum sulfate, 2% sodium bicarbonate, and 64% glycerine. However, the exact chemical breakdown of a particular colorant formula may vary in order to adapt to the product formulation, process conditions, package and the desired shelf life. For example, if the food product to be colored will be heat processed, this may require a difference in the percentage of red cabbage, aluminum sulfate, sodium bicarbonate, and/or the addition of specific additives to the colorant.

The blue colorant can be made into either a liquid or a powdered form. In order to create the powdered form, the liquid colorant may be plated onto an absorbent carrier. In a preferred embodiment, the absorbent carrier is a vegetable fiber or insoluble wheat fiber. The powder can be used in water free systems such as direct compressed tablets or in dry drink mixes to add a blue color to the liquid of the drink.

The colorant solution or powder retains its hue in either water or oil-based systems for food, beverage, drug, and cosmetic use. The user can add the colorant in varying concentrations to achieve a desired product hue. In general, the user must maintain the product at a pH at or above 5.5 to prevent degradation of the colorant from the blue color to a purple or a reddish hue.

A stabilized green colorant solution may be formed using the blue colorant solution as a foundation. A natural yellow colorant such as saffron, tumeric, or beta-carotene may be added to the solution in a desired quantity. Additional sodium bicarbonate is also added to the solution such that the ratio of the aluminum sulfate to sodium bicarbonate is in the range of 1:2 to 1:3. Most preferably the ratio is approximately 1:3. Additives such as polysorbate may also be included in the green colorant solution. The pH of the green colorant solution is generally in the range of 3.7 to 4.2. The green hue of the green colorant solution can be maintained when used with products which have a pH above 5.5.

While the invention is susceptible to various modifications, and alternative forms, specific examples thereof have been herein described in detail. It should be understood, however, that the invention is not to be limited to the particular forms or methods disclosed, but to the contrary, the intention is to cover all modifications, equivalents, and alternatives falling within the spirit and scope of the appended claims.

What is claimed:

1. A water-soluble colorant solution comprising
   red cabbage liquid;
   aluminum sulfate; and
   sodium bicarbonate, wherein a ratio of the percentage by weight of the aluminum sulfate and the percentage by weight of the sodium bicarbonate is between 1:1 and 2:1.

2. The colorant solution of claim 1, wherein the ratio of the percentage by weight of the aluminum sulfate and the percentage by weight of the sodium bicarbonate is approximately 2:1.

3. The colorant solution of claim 1, wherein the pH of the colorant solution is in the range of 3.7 to 4.2.

4. The colorant solution of claim 1, wherein the percentage by weight of the aluminum sulfate is between 1% and 4%.

5. The colorant solution of claim 1, wherein the percentage by weight of the sodium bicarbonate is between 0.5% and 4%.

6. The colorant solution of claim 1, wherein the percentage by weight of the red cabbage liquid is between 10% and 67%.

7. The colorant solution of claim 1, wherein the ratio of percentage by weight of the red cabbage liquid to the percentage by weight of the aluminum sulfate is between 7:1 and 12:1.

8. A method of preparing a water-soluble colorant solution comprising
   treating a red cabbage liquid having a pH in the range of 3.0 to 3.5 with a quantity of aluminum sulfate to reduce the pH of the solution to the range of 1.8 to 2.2; and
   mixing sodium bicarbonate into the solution to raise the pH of the colorant solution to between 3.7 and 4.2.

9. A water-soluble blue colorant solution comprising
   red cabbage liquid;
   aluminum sulfate; and
   sodium bicarbonate, wherein the blue colorant solution retains a blue hue when combined with substances having a pH in the range of 5.5 to 9.

10. A method of modifying the color of a product comprising
    forming a water-soluble blue colorant solution by mixing red cabbage liquid, aluminum sulfate and sodium bicarbonate such that the pH of the solution is in the range of 3.7 to 4.2; and
    combining the blue colorant solution with the product in sufficient quantity to produce the desired hue.

11. The method of claim 10 wherein the product is a food.

12. The method of claim 10 wherein the product is a beverage.

13. The method of claim 10 wherein the product is a drug.

14. The method of claim 10 further comprising plating the colorant solution on a carrier to create a powdered colorant.

15. The method of claim 10 wherein the product is a cosmetic.

16. The method of claim 10 wherein the product is a dry drink mix.

17. The method of claim 14 wherein the carrier is a vegetable fiber.

18. The method of claim 14 wherein the carrier is insoluble wheat fiber.

19. A water-soluble green colorant solution comprising
    red cabbage liquid;
    a yellow colorant;
    aluminum sulfate; and
    sodium bicarbonate, wherein a ratio of the percentage by weight of the aluminum sulfate and the percentage by weight of the sodium bicarbonate is between 1:2 and 1:3.

20. The green colorant solution of claim 19 wherein the ratio of the percentage by weight of the aluminum sulfate and the percentage by weight of the sodium bicarbonate is approximately 1:3.

21. A water-soluble green colorant solution comprising
    red cabbage liquid;
    a yellow colorant;
    aluminum sulfate; and
    sodium bicarbonate, wherein the green colorant solution retains a green hue when combined with substances having a pH in the range of 5.5 to 9.

22. A food product wherein at least a portion of the food product has a blue hue, wherein said blue hue is produced by a water-soluble blue colorant comprising red cabbage liquid, aluminum sulfate and sodium bicarbonate.

23. A cosmetic product wherein at least a portion of the cosmetic product has a blue hue, wherein said blue hue is produced by a water-soluble blue colorant comprising red cabbage liquid, aluminum sulfate and sodium bicarbonate.

24. A drug product wherein at least a portion of the drug product has a blue hue, wherein said blue hue is produced by a water-soluble blue colorant comprising red cabbage liquid, aluminum sulfate and sodium bicarbonate.

* * * * *